United States Patent Office 3,428,647
Patented Feb. 18, 1969

3,428,647
ANTHRA[1,2-c]PYRAZOLE DERIVATIVE
Willy Braun, Hiedelberg, and Ernst Anton, Ludwigshafen (Rhine), Germany, assignors to Badische Anilin- & Soda-Fabrik Aktiengesellschaft, Ludwigshafen (Rhine), Germany
No Drawing. Filed Apr. 5, 1967, Ser. No. 628,574
Claims priority, application Germany, Apr. 6, 1966, B 86,550; Aug. 26, 1966, B 88,634
U.S. Cl. 260—312                                3 Claims
Int. Cl. C07d 49/24; D06p 1/20

ABSTRACT OF THE DISCLOSURE

A dye having the formula:

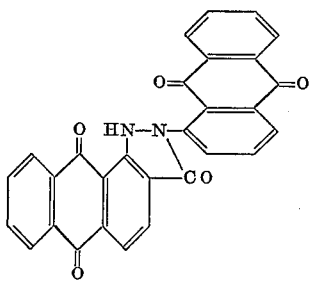

which is prepared by condensation of 1-aminoanthraquinone-2-carboxylic acid - (1 - anthraquinonyl)amide with aluminum chloride in a pyridine base and is outstandingly suitable as an orange pigment dye.

---

This invention relates to an orange pigment dye of the anthraquinone series, to its production and to its use.

Numerous organic pigment dyes having an orange shade are known which satisfy high requirements as regards fastness properties and which are distinguished by outstanding fastness to plasticizers, solvents and light. Not all of these organic pigment dyes similarly satisfy the desire for high brilliance.

This invention relates to the dye having the above formula which as a pigment dye has not only good to excellent fastness properties but also high brilliance and great tinctorial strength.

The new pigment dye is formed when 1-aminoanthraquinone-2-carboxylic acid-(1-anthraquinonyl)amide is heated with aluminum chloride in a pyridine base, such as pyridine, gamma-picoline or mixtures of these pyridine bases at 80° to 150° C. This condensation is carried out for example in 7 to 15 times the amount of pyridine base and in the presence of 3 to 5 times the amount of aluminum chloride.

The new dye may however also be prepared by heating 1-aminoanthraquinone-2-carboxylic acid - (1 - anthraquinonyl)amide with aluminum chloride in a pyridine base of the above-mentioned type and in the presence of inorganic compounds which contain sulfur and oxygen at temperatures of 80° to 125° C., preferably 120° to 125° C.

Examples of inorganic compounds which contain sulfur and oxygen are sulfurous acid, sulfur trioxide, oleum, chlorosulfonic acid, sulfuryl chloride, sodium sulfite and sodium bisulfite. They may also be used mixed together. The use of sodium bisulfite is of particular industrial interest.

The process for the production of the new pigment may be carried out for example by heating the red 1-aminoanthraquinone-2-carboxylic acid-(1-anthraquinonyl)amide in 7 to 15 times the weight of pyridine base and in the presence of 3 to 5 times the amount of aluminum chloride and 0.5 to 3 times the equimolar amount of inorganic compound containing oxygen and sulfur at from 80° C.
to the boiling point of the mixture, preferably from 120° to 125° C. Condensation thus takes place to form the orange pigment which is obtained in yields of 65 to 78%.

The starting materials are advantageously added in the sequence: aluminum cholride, inorganic oxygen-sulfur compound and anthraquinone compound to the pyridine base and then heated to the specified temperature range. The anthraquinone derivative soon passes into solution. The reaction product separates after a short time in the form of blunt yellow crystals whose color changes to orange after suction filtration, washing with pyridine and stirring with water containing hydrochloric acid. The dye may be separated in pure form from sulfuric acid by careful addition of water. It has excellent properties and is suitable as a vat dye but particularly as an orange pigment dye which is distinguished by excellent fastness properties, such as outstanding fastness to light.

The new pigment dye may be produced in two distinct crystal phases, hereinafter referred to as crystal phases A and B. Both crystal phases and also mixtures thereof have outstandingly pigmentary properties.

Crystal phase A of the pigment is characterized in its X-ray diffraction pattern by three strong lines at diffraction angles (2ϑ) of 7.9, 9.7 and 11.5 and by five lines of moderate intensity at 14.9, 15.9, 22.9, 23.6 and 24.0.

The pigment of crystal phase A has an orange hue and has very good general fastness properties. It is distinguished especially by outstanding fastness to light and weathering, good resistance to high temperature and insensitivity to chemical attack, e.g. by solvents or plasticizers.

Crystal phase B of the pigment is characterized in its X-ray diffraction pattern by two strong lines at diffraction angles (2ϑ) of 5.6 and 12.3, two lines of moderate intensity at 24.3 and 24.5 and five weak lines at 14.7, 22.8, 25.6, 26.3 and 28.4. The pigment of this crystal phase, like the crystal phase A, is distinguished by outstanding fastness to light and weathering, resistance to high temperature and insensitivity to chemical attack, e.g. by solvents or plasticizers, and is superior thereto in brillance.

The patterns described were obtained with a counter X-ray spectrometer with Cu K alpha radiation 40 kv., 20 ma., angular aperture 1°, tube scanning speed ¼° per minute. Evaluation of strong, moderate and weak intensity is arrived at by assigning the intensity 100 to the strongest band and classifying those lines having a reference intensity of more than 50 as strong, of 25 to 50 as moderate and of less than 25 as weak.

The crystal phase A of the condensation product obtainable by treatment of 1-aminoanthraquinone-2-carboxylic acid-(1-anthraquinonyl)amide with aluminum chloride in pyridine bases can be obtained therefrom by dissolving it in concentrated sulfuric acid and precipitating it by adding water. It is advantageous to dissolve the dye in 5 to 20 times the weight of concentrated sulfuric acid, to precipitate it again by adding water at a temperature of 30° to 60° C., preferably at 40 to 50° C., and washing the precipitated dye with about 85% sulfuric acid.

For the production of crystal phase B of the condensation product an advantageous procedure is to heat the dye of crystal phase A to temperature above 130° C., advantageously while suspended in a liquid. Water; alcohols, such as dodecyl alcohol; hydrocarbons, such as naphthalene and tetrahydronaphthalene; halogenated and nitrated hydrocarbons, such as trichlorobenzene, chloronaphthalene and nitrobenzene; nitriles, such as benzonitrile and tolunitrile; ketones, such as benzophenone; ethers, such as diphenyl ether and hexamethylene oxide; amides, such as dimethylformamide and N-methylpyrrolidone; or sulfones, such as dimethylsulfone, are suitable as such liquids. Liquids which boil below 130° C. are used under pressure if necessary. Crystal phase A of the pigment is advantageously suspended in five to twenty times the weight of liquid and stirred at 130° to 250° C., preferably at 150° to 200° C. Transition into the brilliant orange crystal phase B of the pigment takes place during this process while the mixture becomes more viscous.

The particle size of the pigment may be reduced by conventional methods, for example by the action of grinding and shearing forces, advantageously in the presence of the above-mentioned solvents or with the addition of suitable grinding assistants, for example sodium chloride.

A particularly valuable pigment is obtained when the crystal phase A (separated from sulfuric acid by adding water at 40° to 60° C., washing and drying) is stirred with 5 to 20 times the weight of dimethylformamide and the mixture is heated to 130° to 150° C. After a heating period of half an hour to two hours, conversion into the crystal phase B is completed. A pigment of the same nature is obtained by using N-methylpyrrolidone, dimethyl sulfoxide or nitrobenzene instead of dimethylformamide.

The pigment may be used for example for coloring printing inks, distempers, or lakes of all types or for mass coloring synthetic, semisynthetic or natural macromolecular substances, such as polyvinyl chloride, polystyrene, polyethylene, polyesters, aminoplasts, rubber and paper. It is also suitable for coloring spinning solutions and may also be used for the pigment coloring of textiles, for example by the pigment printing method. Incorporation of the pigment into the substrates to be colored may be carried out by conventional methods, for example by stirring, rolling, kneading or grinding.

The pigment dye to be used according to this invention has good fastness properties, such as fastness to plasticizers and solvents, and is moreover distinguished by most outstanding brilliance, high purity of shade and great tinctorial strength The light fastness of the pigment is excellent.

The invention is illustrated by the following examples.

Example 1

16 parts of 1-aminoanthraquinone-2-carboxylic acid-(1-anthraquinonyl)-amide (obtainable by condensation of 1-aminoanthraquinone-2-carboxylic chloride with 1-aminoanthraquinone) is introduced at 80° C. into a mixture of 200 parts of pyridine and 72 parts of aluminum chloride. The temperature is raised to 120° C. and the whole kept boiling for two hours. Solution first takes place and shortly afterward the separation of yellow crystals. They are suction filtered at 80° to 100° C., washed with pyridine, stirred with ice-water and a little hydrochloric acid, filtered off, washed free from acid and dried. 7.2 parts of the brownish orange condensation product is obtained. 10 parts of the dye is dissolved in 200 parts of concentrated sulfuric acid at 10° to 15° C. 22 parts of water is run into the red solution so that the temperature does not rise above 50° C. The sulfate of the dye separates in the form of yellow needles. After they have cooled they are suction filtered and washed with 85% sulfuric acid. The sulfate of the dye is then decomposed by introducing it into ice-water. The residue is suction filtered and washed with water until neutral. The water is then displaced by methanol and the product is dried at 80° C. in vacuo. 8.9 parts of orange crystal phase A pigment is obtained. It has a melting point above 360° C. A solution in concentrated sulfuric acid is yellow red.

10 parts of the resultant pigment is ground with 10 parts of alumina trihydrate on a three roll mill in the usual way with 30 parts of linseed oil varnish. The printing ink prepared in this way, when used in book or offset printing methods, gives brilliant orange prints having very good fastness properties, particularly outstandingly fastness to light.

Example 2

50 parts of crystal form A pigment obtained according to Example 1 is introduced while stirring into 500 parts of dimethylformamide and the mixture is then heated for two hours at 150° C. It becomes considerably more viscous and bright orange in color. It is cooled to 100° C., the residue is suction filtered and the filter cake is washed with dimethylformamide, then with water and finally with methanol. The pigment is dried at 60° C. under subatmospheric pressure and 48 parts of the bright orange crystal phase B is obtained. This clearly differs in its X-ray diffraction pattern from the A phase obtainable according to Example 1. The same result is achieved by using 500 parts of N-methylpyrrolidone as solvent instead of dimethylformamide.

0.5 part of the pigment thus obtained is mixed on rollers for four minutes at 140° C. with 60 parts of polyvinyl chloride, 40 parts of di(2-ethylhexyl) phthalate and 0.6 part of the organic tin compound obtainable under the name "Advastab 17M" and pressed into a sheet. A bright orange colored plastics material is obtained which may be used for the production of films, sheeting or profiles. The coloration is outstandingly fast to light and plasticizer.

Example 3

20 parts of the pigment in crystal phase A obtained according to Example 1 is introduced with stirring into 300 parts of nitrobenzene and the mixture is heated for one hour at 180° to 190° C. The pigment becomes clearly more red. It is allowed to cool to 50° C. and the dye is suction filtered, washed with nitrobenzene and finally with methanol. 19.5 parts of the dye is obtained in crystal phase B which agrees in its properties and in the X-ray diffraction pattern with the dye obtained according to Example 2. Trichlorobenzene may be used as solvent instead of nitrobenzene with the same result.

0.05 part of the pigment thus prepared is incorporated into 100 parts of granular polystyrene (suspension polymer). The mixture is passed through an extruder and converted into moldings of any desired shape in an injection molding machine. A brilliant orange polymer is obtained having outstanding fastness to light.

Example 4

20 parts of the pigment of crystal phase A obtained according to Example 1 is introduced while stirring into 400 parts of water. The mixture is heated in an autoclave for five hours at 200° C. and then cooled. The residue is suction filtered, covered with methanol and dried at 60° C. under subatmospheric pressure. 20 parts of the dye of crystal phase B is obtained which agrees in its properties with the pigment obtained according to Example 2.

10 parts of the pigment thus obtained and 10 parts of alumina trihydrate are ground in the conventional way on a three roll mill with 30 parts of linseed oil varnish. The printing ink prepared in this way, when used in book or offset printing methods, give brilliant orange prints having good fastness properties, particularly very high fastness to light.

Example 5

10 parts of the pigment in crystal phase A obtained according to Example 1 is introduced while stirring into 200 parts of diphenyl ether. The mixture is heated for 3 hours at 200° C. and then cooled. The residue is suction filtered, covered with methanol and dried at 60° C. under subatmospheric pressure. 9.8 parts of the dye in crystal phase B is obtained which agrees in its properties with the pigment obtained according to Example 2.

5 parts of the pigment thus obtained is ground in a funnel mill with 95 parts of a clear varnish which has been prepared from 67 parts of a 60% solution of a phthalate resin in xylene, 17 parts of a condensation product of urea, formaldehyde and butanol and 16 parts of glycol acetate. After baking for one hour at 120° C., brilliant orange coatings are obtained which have very good fastness to weathering and overcoating.

Example 6

72 parts of aluminum chloride is introduced into 200 parts of pyridine in such a way that the temperature does not rise above 50° C., the mixture is heated to 80° C. and 7.2 parts of sodium bisulfite and 16 parts of 1-aminoanthraquinone - 2 - carboxylic acid - (1-anthraquinonyl)-amide are added. The temperature is raised to 120° to 125° C. and the whole is heated to boiling under reflux for one hour, the whole at first passing into solution. After a short time the reaction product separates in the form of yellow crystals. They are suction filtered at 80° C., washed with hot pyridine, stirred with cold water containing hydrochloric acid, and the reaction product, which is now orange in color, is filtered off, washed until free from acid and dried. 12.5 parts of an orange dye is obtained which is sparingly soluble in organic solvents, which melts at above 360° C. and which dissolves in concentrated sulfuric acid with a yellow red color. The solution in sulfuric acid does not give any formaldehyde reaction, in contrast to the starting substance.

Example 7

4.3 parts of sodium sulfite and then 8 parts of 1-aminoanthraquinone - 2 - carboxylic acid - (1 - anthraquinonyl) amide are introduced at 80° C. into a mixture of 100 parts of pyridine and 36 parts of aluminum chloride. The whole is boiled for two hours. 5.2 parts of orange pigment dye is obtained which in its properties agrees with the dye obtained according to Example 6.

Example 8

36 parts of aluminum chloride is introduced into 100 parts of pyridine with cooling so that the temperature does not rise above 50° C. The temperature is raised to 80° C., 0.7 part of sulfuric anhydride and 8 parts of 1-aminoanthraquinone-2-carboxylic acid-(1-anthraquinonyl)-amide are introduced and the mixture is heated at 120° to 125° C. for one hour. The product is worked up as described in Example 6. 5.9 parts of an orange dye is obtained which agrees in its properties with the dye obtained according to Example 6.

Example 9

A mixture of 200 parts of pyridine, 72 parts of aluminum chloride, 4.4 parts of 65% oleum and 16 parts of 1-aminoanthraquinone-2-carboxylic acid-(1-anthraquinonyl)amide is heated for two hours at 120° to 125° C. 12.3 parts of an orange dye is obtained which agrees in its properties with the dye obtained according to Example 6.

Example 10

4.4 parts of sulfur dioxide is passed into a mixture of 200 parts of pyridine and 72 parts of aluminum chloride at 80° C. Then 16 parts of 1-aminoanthraquinone-2-carboxylic acid-(1 - anthraquinonyl)amide is introduced and the mixture is heated to 120° to 125° C. for one hour. 12.2 parts of an orange dye is obtained which agrees in its properties with the dye obtained in Example 6.

Example 11

4 parts of chlorosulfonic acid and then 8 parts of 1-aminoanthraquinone-2-carboxylic acid-(1-anthraquinonyl)amide are introduced at 80° C. into a mixture of 100 parts of pyridine and 36 parts of aluminum chloride. The whole is heated for nine hours at 120° to 125° C. and 5.5 parts of an orange dye is obtained which agrees in its properties with the dye obtained according to Example 6.

Example 12

2.3 parts of sulfuryl chloride and then 8 parts of 1-aminoanthraquinone-2-carboxylic acid-(1-anthroquinonyl)amide are introduce at 80° C. into a mixture of 100 parts of pyridine and 36 parts of aluminum chloride. The whole is heated for two hours at 120° to 125° C. and, after working up in accordance with Example 6, 5.5 parts of an orange dye is obtained which agrees in its properties with the dye obtained according to Example 6.

Example 13

3.6 parts of sodium bisulfite and 8 parts of 1-aminoanthraquinone - 2 - carboxylic acid - (1 - anthraquinonyl) amide are introduced at 80° C. into a mixture of 150 parts of pyridine and 36 parts of aluminum chloride. The whole is heated for two hours at 125° C. 5 parts of an orange dye is obtained which agrees in its properties with the dye obtained according to Example 6.

We claim:
1. A dye having the formula:

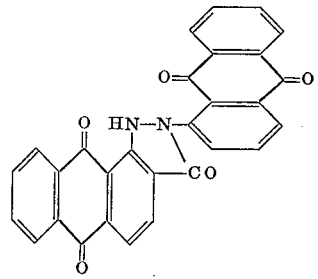

2. A dye as claimed in claim 1 which has an X-ray diffraction pattern exhibiting three strong lines at diffraction angles of 7.9, 9.7 and 11.5 and five lines of moderate intensity at 14.9, 15.9, 22.9, 23.6 and 24.0.

3. A dye as claimed in claim 1 which has an X-ray diffraction pattern exhibiting two strong lines at diffraction angles of 5.6 and 12.3, two lines of moderate intensity at 24.3 and 24.5 and five weak lines at 14.7, 22.8, 25.6, 26.3 and 28.4.

References Cited

Laakso et al.: Tetrahedron, vol. 1, pp. 103–118 (1957).
Patterson et al.: The Ring Index, 2nd ed., p. 595, Washington D.C., Amer. Chem. Soc. 1960.

HENRY R. JILES, *Primary Examiner.*
NATALIE TROUSOF, *Assistant Examiner.*

U.S. Cl. X.R.
8—39; 106—22, 23; 260—41